United States Patent [19]

Graves

[11] 3,997,211
[45] Dec. 14, 1976

[54] RETRACTABLE PATIO ASSEMBLY FOR USE ON A PICKUP TRUCK MOUNTED CAMPER OR THE LIKE

[76] Inventor: Cloise D. Graves, Rte. 2, Box 166, Ontario, Oreg. 97914

[22] Filed: Sept. 2, 1975

[21] Appl. No.: 609,535

[52] U.S. Cl. .............................. 296/23 G; 182/116; 280/163
[51] Int. Cl.² ......................................... B60P 3/32
[58] Field of Search ............. 296/23 G, 62; 182/84, 182/116, 124; 280/163, 164 R, 166

[56] References Cited
UNITED STATES PATENTS

| | | | |
|---|---|---|---|
| 1,327,248 | 1/1920 | Moody | 296/62 |
| 3,330,577 | 7/1967 | Mills | 280/166 |
| 3,392,990 | 7/1968 | Wolf | 280/163 |
| 3,462,170 | 8/1969 | Smith et al. | 280/166 |
| 3,515,406 | 6/1970 | Endsley, Jr. | 280/166 |
| 3,796,456 | 3/1974 | Bergeson | 280/163 |
| 3,912,298 | 10/1975 | Humphrey | 280/166 |

*Primary Examiner*—Robert R. Song
*Assistant Examiner*—David M. Mitchell
*Attorney, Agent, or Firm*—Kolisch, Hartwell, Dickinson & Stuart

[57] ABSTRACT

A stowable patio assembly is provided for use on a recreation vehicle such as a pickup truck mounted camper. The stowable patio assembly utilizes a transversely extending mounting bracket which is arranged below a door opening on a rear wall structure of a camper. The mounting bracket employs a rod extendible therealong on which a platform is laterally shiftable. The platform may be disposed horizontally to a position extending outwardly from the door opening to provide an entranceway into the camper. Depending from the platform is a plurality of steps arranged to provide access to and from the door opening. When it is desired to stow the patio assembly, the platform is laterally shifted from a first substantially horizontal position to a second position alongside the door opening for pivotal movement about the mounting bracket for vertical retractable placement against the wall structure. The steps are pivotal about the platform to thereby provide a stowed inoperable patio assembly adjacent the wall structure. Additionally, foldable banister rails may be pivotally connected to the platform and foldable thereagainst.

12 Claims, 4 Drawing Figures

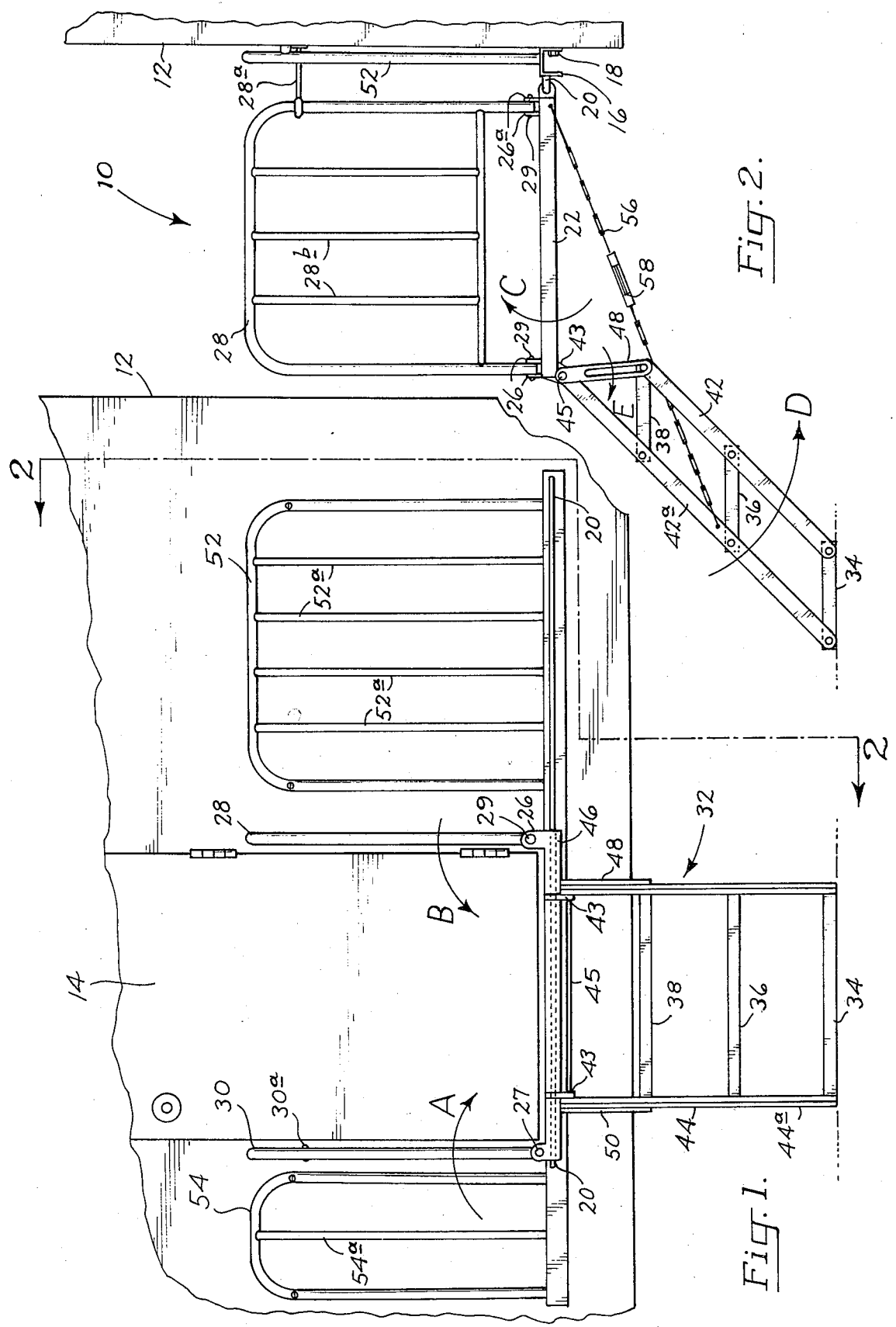

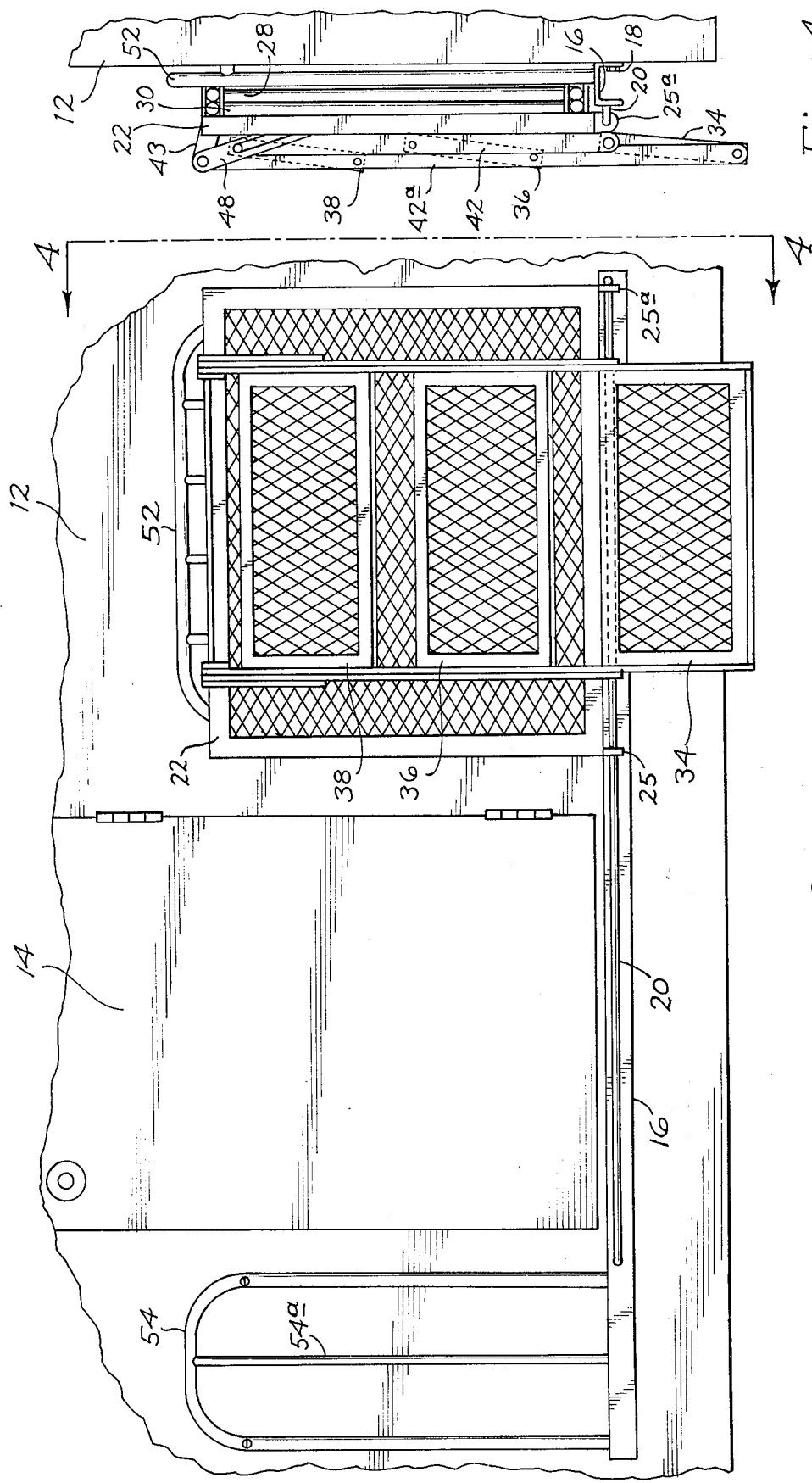

RETRACTABLE PATIO ASSEMBLY FOR USE ON A PICKUP TRUCK MOUNTED CAMPER OR THE LIKE

BACKGROUND OF THE INVENTION

A. Field of the Invention

The present invention relates to recreational vehicles and accessories for use thereon, and more particularly to a stowable patio assembly to be used on a pickup truck-mounted camper, trailer or the like.

Recreational campers typically have a rearwardly located door for access into and out of the camper. When such campers were initially marketed, they generally were confined within the longitudinal boundaries of a pickup truck bed. However, with the increased demand for more substantial camper furnishings, the campers have become correspondingly larger and extend outwardly over the rear tailgate of the pickup as well as substantially over the side rails. Because of the larger campers, it has been necessary to provide for an access ramp or stairs for entering and leaving the camper.

Many states have passed laws which require that a camper have an unobstructed rear door during highway travel. An unobstructed rear door has been deemed necessary in order to provide for quick access in case a camper vehicle becomes involved in an accident and it is imperative for occupants riding in the camper to be removed rapidly and efficiently. While prior art stairs and platforms have been proposed for camper use, most of these devices obstruct the door opening when in a stowed position. Therefore, it has become necessary for a stairwell and a platform to be developed which may be readily assembled from a non-door obstructing stowed position to an operable position. Additionally, prior art camper door stairs do not provide for a patio or larger entrance platform. A larger platform is important in order to provide for temporary storage of articles to be placed into the camper as well as providing additional room for more than one individual at a time. The present invention provides for a stowable patio assembly which may be arranged with a platform extending substantially horizontally from below a camper vehicle door opening and further being laterally shiftable to one side thereof for substantially vertical stowage against a rear wall structure. A step structure, hingedly secured to the platform and movable therewith for substantially vertical placement when the platform is in the stowed position is also provided. Banister rails are provided alongside marginal edges of the platform to provide hand holds and protective supports for individuals entering and leaving the camper. The banister rails are foldable on a top portion of the platform for stowed relationship therewith when the platform is laterally shifted alongside the door opening for subsequent pivoting about the mounting bracket and stowage.

B. Description of the Prior Art

There have been several proposals for camper step constructions in the prior art. A typical example is U.S. Pat. No. 3,392,990, wherein a retractable camper body door step is disclosed. The door step is pivotally attached to a rod extending transversely along the back wall of a camper. The step may be operatively positioned either in front of or alongside the door opening and it is contemplated that the step may be secured to an inverted inoperative position alongside the door opening. However, no patio assembly is disclosed on the top of the steps nor are protective guide rails suggested and therefore it can be appreciated that this patent does not provide nor suggest several essential features of the present invention.

A further prior art patent to be considered is U.S. Pat. No. 3,796,456. Here, there is disclosed a ladder and platform assembly used in conjunction with a conventional rear-access camper. The assembly utilizes a fixed rectangular frame having receiving tracks for slidably engaging a movable frame inwardly and outwardly through an area located beneath the camper proper. The ladder is adapted to slide within the frame and is also pivotally connected to the rearward end of the fixed frame. While this device provides for a stowable ladder and platform assembly unobstructing the rear door, it is apparent that the assembly must be custom tailored for each camper in order to be slidably disposed thereunder. Furthermore, this patent does not suggest the use of protective side rails which may also be stowed with the ladder and platform assembly.

U.S. Pat No. 3,462,170 describes a camper step construction in which a collapsible step frame is pivotally secured to a tailgate of a pickup truck for subsequent collapsible stowage against a camper door. While this construction provides for a retractable configuration, it is apparent that it would be unacceptable in those states requiring free access to and from a rear door opening of a camper while the vehicle is used on the road.

Additional U.S. patents deemed of interest but not of further comment are U.S. Pat. Nos. 3,330,577, 3,370,875 and 3,515,406.

SUMMARY OF THE INVENTION

The present invention provides for a stowable patio assembly for use on a wall structure of a recreational vehicle adjacent to a door opening. The present invention utilizes a transversely extending mounting means or bracket which is secured below a bottom portion of the door for the slidable reception thereon of a platform means which is also pivotally connected to the bracket. The platform means is therefore selectively positionable in either horizontal or vertical arrangement in front of or alongside the door opening. Pivotally connected to a front portion of the platform means is an ascending and descending means for providing ingress and egress to the camper through the door opening. The ascending and descending means is arranged to engage the ground when the platform is substantially horizontally extended, and further utilizes a parallel bar linkage system having steps for ready collapse. Also arranged on the platform are banister rail sections which may be folded downwardly against a top portion of the platform for providing a substantially flat stowable patio. When it is desired to stow the patio assembly, the platform is shifted laterally along a rod disposed on the bracket and thereupon pivoted upwardly to a substantially vertical position and stored against a protective rail on the wall structure. The collapsible parallel bar linkage steps, being pivotally connected to the platform follow the same upwardly thereagainst for stowable retraction to provide an unobstructed door opening.

It is an object of the present invention to provide a patio extending outwardly from a recreational vehicle rear door sufficiently sized to support temporarily stored objects and accommodate individuals desiring access into the camper. Additionally, it is an object of the present invention to provide a patio assembly which may be stowed adjacent to and alongside a camper door opening so that the camper door will not be obstructed during travel of the vehicle. Such an unobstructed door opening is important when the vehicle becomes involved in an accident and ready access to the door is imperative.

Another object of the present invention is to provide a stowable patio assembly which utilizes a tensioning means for rigidly disposing the ascending and descending means against the ground to thereby insure a rigid structure when the patio assembly is in use.

Yet a further object of the invention is to provide a stowable patio assembly which may be readily adapted to recreational vehicles such as pickup truck loaded campers and other trailer vehicles.

Additional objects of the present invention reside in the specific construction of the exemplary apparatus hereinafter particularly described in the specification and shown in the several drawings.

BRIEF DESCRIPTION OF THE DRAWINGS

Novel features of the improved, stowable patio assembly in accordance with the present invention will be more readily understood from a consideration of the following description taken together with the accompanying drawings, in which a preferred adaptation is illustrated with the various parts thereof identified by suitable reference characters in each of the views, and in which:

FIG. 1 is a view looking toward the rear of a camper or recreational vehicle showing the stowable patio assembly of the present invention in its operative position;

FIG. 2 is a side view taken along lines 2—2 of FIG. 1 and illustrates the arrangement of parallel bar linkage steps used in accordance with the slidable platform of the present invention;

FIG. 3 is a rear view of a recreational vehicle or camper illustrating the stowable patio assembly of the present invention in its stowed or inoperative position; and FIG. 4 is a side view of FIG. 3 taken along lines 4—4.

DETAILED DESCRIPTION OF THE INVENTION

With reference directed initially to FIGS. 1 and 2, an embodiment of a stowable patio assembly in accordance with the principles of the present invention is generally designated at 10. A rear wall structure 12 of a pickup truck loaded camper or other recreational trailer is designated at 12 and incorporates an access door 14. Disposed below door 14 is a transversely extending mounting means or bracket 16 which is secured to rear wall structure 12 by suitable bolts 18 or other equivalent fasteners such as lag screws, etc. Transversely extending mounting means 16 may conveniently be a formed channel or angle iron. Arranged to extend longitudinally of mounting bracket 16 is a slide rod 20. Slide rod 20 extends from a furthermost right position as seen in FIG. 1 to a location just to the left of door 14.

A platform means 22, serving as an upper supporting means for patio assembly 10, is constructed of generally rectangular configuration and utilizes angle iron welded together to form a marginal bounded frame. A raised expanded metal screen or grating 24 provides a face supporting portion of platform means 22. Platform means 22 is constructed with projecting lugs 25 and 25a secured thereto (see FIGS. 3 and 4). Lugs 25 and 25a are arranged to be slidably engaged on rod 20. Thus, it may be appreciated that platform means 22 is laterally shiftable along and pivotally connected to rod 20 for selective horizontal and vertical positioning either in front of door 14 or alongside thereof.

Arranged on an upper surface of platform means 22 are pivotal supports 26, 26a and 27. An additional pivotal support is disposed behind pivotal support 27 and is hidden from view in FIG. 1. Collapsible banister sections 28 and 30 are pivotally supported by roll pins 27 in pivot support brackets 26, etc. and are arranged to be foldable onto the upper surface 24 of platform means 22 for subsequent stowage to be hereinafter particularly described. Detachable banister securing brackets are shown at 28a and 30a.

An ascending and descending means providing for ingress and egress to camper 12 is generally designated at 32. Ascending and descending means 32 comprises a plurality of steps 34, 36 and 38 which are joined in spaced relationship by opposing collapsible parallel bar linkages 42, 42a and 44, 44a, respectively. Parallel bar linkages 42, 42a and 44, 44a are pivotally secured to a front margin 46 of platform means 22 by means of lugs 43 through which a pin 45 is disposed. Steps 34, 36 and 38 are pivotally connected to the parallel bar linkages by conventional pivot means. Disposed at an upward portion of the parallel bar linkages are slide guides 48 and 50. Guides 48 and 50 are provided with slots in order to permit the collapsing of each parallel bar linkage. A mounting bracket connected stowage support rail 52 is disposed alongside of door 14. Another rail 54 may also be arranged on the other side of door 14, if desired.

A tensioning means 56 is secured to platform 22 and conveniently to a front linkage such as linkage 42a of parallel bar linkage 42, 42a. A turnbuckle 58 is appropriately arranged on the tensioning means to enable an individual to increase the tension therein for disposing bottom step 34 into a more rigidly engaging position against a ground surface when patio assembly 10 is in its operable position.

In order to stow patio assembly 10 from its substantially horizontal operable position as shown in FIGS. 1 and 2 to an inoperable retracted stowed position as indicated in FIGS. 3 and 4, the following steps may conveniently be employed. First, detachable securing means 30a is released or uncoupled to permit the downward pivoting of protective banister rail 30 in the direction of arrow A so as to be disposed against face 24 of platform means 22. Protective banister rail 28 is pivoted downwardly in the direction of arrow B onto the top of banister rail 30 after detachable securing means 28a has been uncoupled. Thereupon, slidable platform 22 may be laterally shifted from the aforementioned first substantially horizontal position to a second position alongside door 14 for pivotal movement about slide rod 20 for substantially vertical retractable placement adjacent wall structure 12. It may be appreciated that as platform means 22 with folded banister rails 28 and 30 is pivoted in the direction of arrow C, step assembly 32 will correspondingly pivot in the direction of arrow D due to the pivoting in the direction of arrow E of guides 48 and 50 when step 34 is displaced from the ground engagement. Stowable patio assembly 10 may then be placed in the totally collapsed position as viewed in FIGS. 3 and 4 and secured together against support rail 52 by means of an elongated rubber strap, chain or other fastening means. Tensioning means 56 may be released from either platform means 22 or front parallel bar linkage member 42a, in order to permit adequate collapsing of parallel bar linkages 42, 42a and 44, 44a onto platform means 22.

Further, it is to be noted that members 52a, 54a and 28b may be decoratively constructed, as for example, by using twisted flat bars.

It may be readily appreciated that the stowable patio assembly of the present invention provides for a readily accessible platform means which may be laterally shiftable from a first substantially horizontal position to a second position alongside a door opening of a recreational vehicle for pivotal movement about a mounting means and substantially vertical retractable placement against a wall structure. Furthermore, an ascending and descending means as hereinabove described is pivotal about a margin of the platform means to also be retractably disposed against the platform means to thereby provide a stowed inoperable patio assembly adjacent a wall structure.

Component parts of patio assembly 10 are contemplated as being of steel construction, but other materials such as aluminum, etc. could be readily employed.

While the present invention has been particularly shown and described with reference to the foregoing embodiment herein, it will be understood by those skilled in the art that other changes in form and detail may be made therein without departing from the spirit and scope of the invention as defined in the appended claims. For instance, a stowable patio assembly according to the principles of the present invention could be constructed large enough to hold several couples in order to provide an area for barbeques, etc. arranged off of the ground. Such a large patio could be stored alongside the door in the aforementioned retractable position, and it must be kept in mind that the size of the patio is limited only by the width of the recreational vehicle camper.

What is claimed is:

1. A stowable patio assembly for use adjacent to a door opening on a wall structure of a vehicle-mounted camper, trailer or the like comprising:
    transversely extending mounting means adapted for attachment adjacent to the wall structure;
    platform means laterally shiftable along and pivotally connected to said mounting means for selective horizontal and vertical positioning in front of and alongside the door opening; and
    ascending and descending means pivotally connected to a margin of said platform means for engaging a ground surface and providing support for a horizontally disposed platform means;
    said platform means being laterally shiftable from a first substantially horizontal position to a second position alongside the door opening for pivotal movement about said mounting means and substantially vertical retractable placement adjacent the wall structure; said ascending and descending means being pivotal about said margin for retractable placement against said platform means to thereby provide a stowed inoperable patio assembly adjacent the wall structure and the unobstructed door opening.

2. A stowable patio assembly as described in claim 1 wherein said ascending and descending means comprises a plurality of steps joined in spaced relationship by opposing collapsible parallel bar linkages, each of said parallel bar linkages having an upper end thereto pivotally connected to an outer margin of said platform means.

3. A stowable patio assembly as described in claim 2 wherein collapsible bannister sections are pivotally arranged on said platform means for assembly in a first upstanding position and assembly in a second collapsed substantially parallel position adjacent said platform means, said banister sections adapted to be detachably secured to the wall structure when disposed in said first upstanding position.

4. A stowable patio assembly as described in claim 3 wherein a rail is secured to said mounting means and is disposed substantially vertically adjacent to the wall for support of said platform means and said ascending and descending means when said platform means is retractably disposed.

5. A stowable patio assembly as described in claim 4 wherein tensioning means are releasably secured to said platform means and at least one of said parallel bar linkages for urging a bottom step securely against the ground when said platform means is horizontally positioned.

6. A stowable patio assembly as described in claim 5 wherein said mounting means comprises an elongated channel member having a rod attached thereto and extending therealong; said platform means being pivotal about and laterally shiftable along said rod.

7. In combination, a vehicle mounted camper, trailer or the like having a door opening on a wall structure and a stowable patio assembly comprising:
    transversely extending mounting means attached to said camper or the like adjacent to said wall structure;
    platform means laterally shiftable along and pivotally connected to said mounting means for selective horizontal and vertical positioning in front of and alongside the door opening; and
    ascending and descending means pivotally connected to a margin of said platform means for engaging a ground surface and providing support for a horizontally disposed platform means;
    said platform means being laterally shiftable from a first substantially horizontal position to a second position alongside said door opening for pivotal movement about said mounting means and substantially vertical retractable placement adjacent said wall structure; said ascending and descending means being pivotal about said margin for retractable placement against said platform means to thereby provide a stowed inoperable patio assembly adjacent said wall structure and the unobstructed door opening.

8. A combination as described in claim 7 wherein said ascending and descending means comprises a plurality of steps joined in spaced relationship by opposing collapsible parallel bar linkages, each of said parallel bar linkages having an upper end thereto pivotally connected to an outer margin of said platform means.

9. A combination as described in claim 8 wherein collapsible banister sections are pivotally arranged on said platform means for assembly in a first upstanding position and assembly in a second collapsed, sustantially parallel position adjacent said platform means, said banister sections being detachably secured to said wall structure when disposed in said first upstanding position.

10. A combination as described in claim 9 wherein a rail is secured to said mounting means and is disposed substantially vertically adjacent to the wall for support of said platform means and said ascending and descending means when said platform means is retractably disposed.

11. A combination as described in claim 10 wherein tensioning means are releasably secured to said platform means and at least one of said parallel bar linkages for urging a bottom step securely against the ground when said platform means is horizontally positioned.

12. A combination as described in claim 11 wherein said mounting means comprises an elongated channel member having a rod attached thereto and extending therealong; said platform means being pivotal about and laterally shiftable along said rod.

* * * * *